Patented Feb. 20, 1951

2,541,987

UNITED STATES PATENT OFFICE 2,541,987

CHLORINE-CONTAINING POLYMER PLASTICIZED WITH GREASELIKE OLEFIN-CARBON MONOXIDE POLYMER

Richard D. Cramer, Wilmington, Del., assignor to E. I. du Pont de Nemours & Company, Wilmington, Del., a corporation of Delaware No Drawing. Application August 30, 1948, Serial No. 46,922

7 Claims. (Cl. 260—32.8)

This invention relates to polymeric materials. More specifically, it relates to plasticized compositions comprising halogen-containing polymers.

The art is replete with examples of many different types of monomeric compounds used as plasticizers for halogen-containing polymers, for in general halogen-containing polymers must be plasticized for most advantageous use. However, the vast majority of these plasticizers have serious shortcomings. For example, some do not maintain their plasticizing action at low temperatures, some are migratory in nature, exuding rather rapidly out of the plasticized compositions at normal temperatures and much more rapidly when exposed to higher temperatures, and some are somewhat volatile under ordinary conditions so that they are gradually lost during service. The use of polymeric plasticizers has been suggested as a means for overcoming the above mentioned disadvantages of monomeric plasticizers. But the polymeric plasticizers which have been suggested hitherto are appreciably water sensitive and in addition are relatively expensive.

This invention has as an object a new and useful plasticized resinous composition. A further object is an improved plasticized composition comprising a halogen-containing polymer and a plasticizer therefor which is free from the disadvantages mentioned above. Further objects reside in methods for obtaining these improved plasticized resinous compositions. Other objects will appear hereinafter.

The above objects are accomplished by incorporating with chlorine-containing polymers those copolymers of a monoolefin or monoolefins and carbon monoxide which are grease-like materials ranging in properties from liquids to semisolid products. These monoolefin/carbon monoxide polymers are referred to as grease-like in the usual sense as being oily, unctuous and hence slippery.

I have found that when a monoolefin/carbon monoxide polymer of this kind is incorporated as a plasticizer with a chlorine-containing polymer that a plasticized resinous composition is obtained in which the plasticizer maintains its plasticizing action for long periods of time, and which is effective at low temperature, and which has little tendency to exude at normal or at elevated temperature.

The monoolefin/carbon monoxide polymers used as plasticizers in accordance with this invention can be prepared as disclosed in the copending application of Pinkney, filed May 21, 1948, Serial No. 28,365, by heating monoolefin/carbon monoxide mixtures at temperatures from 100° C. to 250° C. and under a pressure of from 100 lb. to 5000 lb. per square inch in the presence of a polymerization catalyst which is active at these temperatures such as organic peroxides, azonitriles, etc., the reaction being conducted in the presence of an active solvent, i. e., a telogen such as 1,3-dioxolane, acetone, isopropyl alcohol, etc., which is used in amount of from about 1% by weight, based on the total polymerizable monoolefin and carbon monoxide charged, up to any excess since the telogen may serve as a solvent for the polymerization. Compounds which serve as telogens to terminate the polymerization at a low molecular weight are further described in the above identified application and in U. S. Patent 2,402,137. The preparation of a typical monoolefin/carbon monoxide polymer for plasticizer use is given below wherein the parts given are by weight.

In a silver-lined reactor is placed 79.2 parts of acetone and 2.4 parts of di(tertiary butyl)peroxide. The reactor is closed and pressured at room temperature to 730 lb./sq. in. with a gaseous mixture of 75% ethylene and 25% carbon monoxide by weight. The contents are then heated at 134–137° C. with agitation for 15 hours while maintaining the internal pressure in the reactor at 1850–2000 lb./sq. in. by intermittent injection of the ethylene/carbon monoxide gas mixture. At the end of this time the reactor is cooled to room temperature and vented to the atmosphere, the contents are transferred to a still-pot, and the volatile constituents are removed by distillation. Final traces of volatile material are removed by heating under a stream of nitrogen at 100° C. under a pressure of 2 millimeters of mercury for two hours. There is thus obtained 80.5 parts of a grease-like ethylene/carbon monoxide polymer which, by analysis, is found to have 30.7% combined carbon monoxide and an average molecular weight of 1302.

The examples given below, in which the parts are by weight, are further illustrative of the practice of this invention. In these examples the average molecular weights given are determined by the ebullioscopic method in benzene as described on pages 43–45 of "Theoretical Organic Chemistry" by Julius B. Cohen, revised by P. C. Austin, MacMillan and Co., Ltd., London, 1943. The values for elastic modulus (stiffness) also given in these examples are determined by ASTM method D–638–44T.

Example I

A mixture of 0.75 part of polyvinyl chloride and 0.25 part of a grease-like, viscous, liquid propylene/ethylene/carbon monoxide polymer containing 48.6% combined carbon monoxide is dissolved in five parts of cyclohexanone by stirring and gentle warming. A clear solution is obtained which is flowed in a thin film onto a glass plate. The solvent is allowed to evaporate at room temperature and residual traces removed by baking at 105° C. for ½ hour. The compatible film so obtained is clear, flexible, tough, mar resistant and shows no deterioration in properties after two days immersion in water.

The propylene/ethylene/carbon monoxide polymer used in the foregoing example is prepared in general as previously described using 2 cc. of di(tertiary butyl) peroxide catalyst in a 400 cc. silver-lined high pressure tube which is charged with 100 g. propylene in the cold, the tube closed, heated to 135° C., and then pressured with a 45/55 carbon monoxide/ethylene gas mixture to approximately 1000 atmospheres pressure. The tube is then heated at 133–136° C. maintaining the pressure at 810–1000 atmospheres pressure by intermittent repressuring with the 45/55 carbon monoxide/ethylene gas mixture until the total pressure drop is 2585 atmospheres.

Example II

A mixture of 20 parts of polyvinyl chloride and six parts of a grease-like ethylene/carbon monoxide polymer containing 31.1% combined carbon monoxide and exhibiting an average molecular weight of 1143 is dissolved in 174 parts of methyl ethyl ketone to give a smoothly flowing, somewhat viscous solution. This solution is flowed at 55° C. in a thin film onto a glass plate, the solvent is evaporated at 30–40° C. and the film is removed. There is thus obtained a transparent, flexible, self-supporting film which exhibits an elastic modulus (stiffness) of 8130 lb./sq. in.

The ethylene/carbon monoxide polymer used is prepared in general as previously described using a 61/39 by weight ethylene/carbon monoxide gas mixture at 134–135° C. with di(tertiary butyl) peroxide as catalyst.

A similar film prepared in the same manner from another sample of the same batch of polyvinyl chloride without the added ethylene/carbon monoxide polymer plasticizer is transparent but much stiffer, exhibiting an elastic modulus of 125,000 lb./sq. in. in the same test.

Example III

A mixture of seven parts of a grease-like ethylene/carbon monoxide polymer containing 27.4% combined carbon monoxide and exhibiting an average molecular weight of 579, 18 parts of a vinyl chloride/vinyl acetate copolymer (95% vinyl chloride), 0.54 part of a stabilizer composition containing 39% strontium octoate, 14% methyl isobutyl ketone, and 47% water, and 0.54 part dibutyl ammonium oleate is milled on stainless steel mixing rolls at 160° C. for ten minutes. The resulting mixture is then sheeted from the rolls and pressed between flat platens at 170° C. for three minutes under 10,000 lb./sq. in. pressure. There is thus obtained a smooth, pliable, transparent film, 0.006 in. thick, which exhibits an elastic modulus of 5,370 lb./sq. in. A like film prepared in the same manner from a composition made up of additional samples from the same batches of the above given ingredients without the added ethylene/carbon monoxide polymer is noticeably less pliable and exhibits an elastic modulus of 57,400 lb./sq. in.

The ethylene/carbon monoxide polymer used is prepared in general as previously described using an 88/12 by weight ethylene/carbon monoxide gas mixture at 134–135° C. in 1,3-dioxolane with di(tertiary butyl) peroxide as catalyst.

Example IV

A mixture of seven parts of a grease-like ethylene/carbon monoxide polymer containing 12.8% combined carbon monoxide and exhibiting an average molecular weight of 524, 18 parts of a vinyl chloride/vinyl acetate copolymer (95% vinyl chloride), 0.54 part of the same stabilizer composition as in Example III, and 0.54 part of dibutyl ammonium oleate is milled on stainless steel mixing rolls at 165° C. for ten minutes. The resulting mixture is then sheeted from the rolls and pressed between flat platens at 170° C. for three minutes under 10,000 lb./sq. in. pressure. There is thus obtained a smooth, pliable, transparent, 0.007 in. thick film, which exhibits an elastic modulus of 33,200 lb./sq. in. A like film prepared in the same manner from a composition made up of additional samples from the same batches of the above given ingredients without the added ethylene/carbon monoxide polymer is noticeably less pliable and exhibits an elastic modulus of 57,400 lb./sq. in.

The ethylene/carbon monoxide polymer used is prepared in general as previously described using a 75/25 by weight ethylene/carbon monoxide gas mixture at 185° C. in cyclohexane with di(tertiary butyl) peroxide as catalyst.

Example V

A mixture of seven parts of a grease-like ethylene/carbon monoxide polymer containing 46.9% combined carbon monoxide and exhibiting an average molecular weight of 354, 18 parts of a vinyl chloride/vinyl acetate copolymer (95% vinyl chloride), 0.54 part of the same stabilizer composition as given in Example III, and 0.54 part of dibutyl ammonium oleate is milled on stainless steel mixing rolls at 165° C. for ten minutes. The resulting mixture is then sheeted from the rolls and pressed between flat platens at 170° C. for three minutes under 10,000 lb./sq. in. pressure. There is thus obtained a smooth, pliable, transparent, 0.006 in. thick film, which exhibits an elastic modulus of 7,350 lb./sq. in. A like film prepared in the same manner from a composition made up of additional samples from the same batches of the above given ingredients without the added ethylene/carbon monoxide polymer is noticeably less pliable and exhibits an elastic modulus of 57,400 lb./sq. in.

The ethylene/carbon monoxide polymer used is prepared in general as previously described using a 50/50 by weight ethylene/carbon monoxide gas mixture at 135° C. in 1,3-dioxolane with di(tertiary butyl) peroxide as catalyst.

Example VI

A mixture of seven parts of a grease-like ethylene/carbon monoxide polymer containing 24.8% combined carbon monoxide and exhibiting an average molecular weight of 751 and 18 parts of chlorinated polymer of ethylene (containing 27% chlorine and prepared as described in U. S. Patent 2,183,556) is milled on stainless steel mixing rolls at 120° C. for ten minutes. The material is then sheeted from the rolls and pressed betweeflat platens at 135° C. for three minutes under 6,000 lb./sq. in. pressure to give a smooth, flexible, 0.030 in. thick film, which exhibits an elastic modulus of 1830 lb./sq. in. as contrasted to a value of 2,850 lb./sq. in. for a similar film pressed under the same conditions from another sample of the same batch of chlorinated polymer of ethylene without the added ethylene/carbon monoxide polymer.

The ethylene/carbon monoxide polymer used is prepared in general as described in Example III.

Example VII

A mixture of five parts of a grease-like ethylene/carbon monoxide polymer containing 27.6% combined carbon monoxide and exhibiting an average molecular weight of 540, 20 parts of chlorosulfonated polymer of ethylene (containing 29% chlorine and 2% sulfur and prepared as described in U. S. Patent 2,212,786), 16 parts of calcium carbonate pigment, 0.2 part of hydroquinone monobenzyl ether, 0.2 part of benzothiazyldisulfide, two parts of rosin, 0.6 part of polyethylene glycol, molecular weight 1500, 2.4 parts of magnesium oxide, and 0.8 part of litharge is milled on stainless steel mixing rolls at room temperature until homogeneous. The material is then sheeted from the rolls and press-cured between flat platens at 145° C. for one hour under ten lb./sq. in. pressure to give a flexible, tough 0.015 in. thick sheet showing no signs of exudation of plasticizer. This sheet exhibits an elastic modulus of 1,730 lb./sq. in. as contrasted to a value of 2,500 lb./sq. in. for a like film prepared in a similar manner from additional samples of the same batches of materials given above without the added ethylene/carbon monoxide polymer.

The ethylene/carbon monoxide polymer is prepared in general in the same manner as that described in Example III.

Example VIII

A mixture of seven parts of a grease-like ethylene/propylene/carbon monoxide polymer containing 28.3% combined ethylene, 35.6% combined propylene, and 36.1% combined carbon monoxide and exhibiting an average molecular weight of 735; 18 parts of a vinyl chloride/vinyl acetate copolymer (95% vinyl chloride) and 0.54 part of the same stabilizer composition as given in Example III is milled on stainless steel mixing rolls at 165° C. for ten minutes. The material is sheeted from the rolls and pressed between flat platens at 190° C. for three minutes under 10,000 lb./sq. in. pressure. There is thus obtained a smooth, transparent 0.007 in. thick film which exhibits an elastic modulus of 15,400 lb./sq. in. as contrasted to a value of 86,100 lb./sq. in. for a like film prepared in a similar manner from a composition made up of further samples from the same batches of ingredients given above without the added ethylene/propylene/carbon monoxide polymer.

The ethylene/propylene/carbon monoxide polymer is prepared in general by the manner previously given using a 60/20/20 by weight mixture of ethylene/propylene/carbon monoxide at 135° C. in 1,3-dioxolane with di(tertiary butyl)peroxide as catalyst.

Example IX

A mixture of seven parts of a grease-like ethylene/propylene/carbon monoxide polymer containing 17.1% combined carbon monoxide and exhibiting an average molecular weight of 1014; 18 parts of a vinyl chloride/vinyl acetate copolymer (95% vinyl chloride), and 0.54 part of the same stabilizer composition as given in Example III is milled on stainless steel mixing rolls at 165° C. for ten minutes. The material is sheeted from the rolls and pressed between flat platens at 190° C. for three minutes under 10,000 lb./sq. in. pressure. There is thus obtained a smooth, transparent 0.005 in. thick film which exhibits an elastic modulus of 15,100 lb./sq. in. as contrasted to a value of 86,100 lb./sq. in. for a like film prepared in a similar manner from a composition made up of further samples from the same batches of ingredients given above without the added ethylene/propylene/carbon monoxide polymer.

The ethylene/propylene/carbon monoxide polymer is prepared in general by the manner previously given using an 80/10/10 by weight mixture of ethylene/propylene/carbon monoxide at 135° C. in 1,3-dioxolane with di(tertiary butyl)peroxide as catalyst.

Example X

A mixture of seven parts of a grease-like ethylene/propylene/carbon monoxide polymer containing 41.3% combined ethylene, 25.4% combined propylene, and 33.3% combined carbon monoxide and exhibiting an average molecular weight of 570, 18 parts of a vinyl chloride/vinyl acetate copolymer (95% vinyl chloride) and 0.54 part of the same stabilizer composition as given in Example III is milled on stainless steel mixing rolls at 165° C. for ten minutes. The material is sheeted from the rolls and pressed between flat platens at 190° C. for three minutes under 10,000 lb./sq. in. pressure. There is thus obtained a smooth, transparent, 0.007 in. thick film which exhibits an elastic modulus of 9,260 lb./sq. in. as contrasted to a value of 86,100 lb./sq. in. for a like film prepared in a similar manner from a composition made up of further samples from the same batches of ingredients given above without the added ethylene/propylene/carbon monoxide polymer.

The ethylene/propylene/carbon monoxide polymer used in this example is prepared in general by the manner previously given using a 75/5/20 by weight mixture of ethylene/propylene/carbon monoxide at 133–139° C. in 1,3-dioxolane with di(tertiary butyl)peroxide as catalyst. As a final stage of purification prior to use, this polymer is run through a stripping still at 203° C. under one millimeter of mercury pressure, thereby removing volatile, low molecular weight products.

Example XI

A mixture of seven parts of a liquid ethylene/isobutylene/carbon monoxide polymer containing 25.0% combined carbon monoxide and exhibiting an average molecular weight of 755, 13 parts of a vinyl chloride/vinyl acetate copolymer (95% vinyl chloride) and 0.54 part of the same stabilizer composition as given in Example III is milled on stainless steel mixing rolls at 165° C. for ten minutes. The material is sheeted from the rolls and pressed between flat platens at 190° C. for three minutes under 10,000 lb./sq. in. pressure. There is thus obtained a smooth transparent, 0.006 in. thick film which exhibits an elastic modulus of 34,900 lb./sq. in. as contrasted to a value of 86,100 lb./sq. in. for a like film prepared in a similar manner from a composition made up of further samples of the same batches of ingredients given above without the added ethylene/isobutylene/carbon monoxide polymer. This ethylene/isobutylene/carbon monoxide polymer is prepared as follows.

In a silver-lined reactor is placed 233.7 parts of 1,3-dioxolane and 9.6 parts of di(tertiary butyl) peroxide. The reactor is closed, evacuated, cooled in a solid carbon dioxide/methanol bath, and 180 parts of isobutylene distilled in. The reactor is then pressured to 1900 lb./sq. in with a gaseous mixture of 50% ethylene and 50% carbon monoxide by weight. The contents of the reactor are then heated at 129–135° C. with agitation for thirteen hours while maintaining the internal pressure in the reactor at 1900–2000 lb./sq. in. by intermittent addition of the ethylene/carbon monoxide gas mixture. At the end of this time, the reactor is cooled to room temperature, vented to the atmosphere, and the 1,3-dioxolane distilled off. Final traces of 1,3-dioxolane are removed from the product by heating at 100° C. under a pressure of one millimeter of mercury for two hours. As a final stage of purification prior to use, this polymer is run through a stripping still at 203° C. under one millimeter of mercury pressure, thereby removing volatile, low molecular weight components. There is thus obtained 106 parts of a liquid ethylene/isobutylene/carbon monoxide polymer.

The chlorine-containing polymers, which, in admixture with the above-described liquid and grease-like monoolefin/carbon monoxide polymers, constitute the compositions of this invention, are those containing from 20 to 85.5% combined chlorine by weight. These polymers may be either homopolymers or copolymers; 85.5% represents the maximum chlorine content possible, i. e., polytetrachloroethylene homopolymer, wherein the only substituents on carbon are chlorine. Of these preferred for reasons of greater availability are the addition polymers containing from 20 to 85.5% combined chlorine by weight. Of these preferred for reasons of greater compatability with the liquid and grease-like monoolefin/carbon monoxide polymers, are those containing from 25 to 72% combined chlorine. Especially preferred for reasons of ready availability coupled with good compatibility with the liquid and grease-like monoolefin/carbon monoxide polymers are the chlorine-containing polymers of polymerizable compounds containing a terminal carbon to carbon double bond, for instance, chlorine-containing vinylidene polymers, chlorine-containing polymers from polymerizable chlorine-containing vinylidene monomers, and after-chlorinated addition polymers. Particular examples of suitable chlorine-containing polymers are such vinyl and vinylidene polymers as polyvinyl chloride, polyvinylidene chloride, vinyl chloride/vinyl acetate copolymers, vinylidene chloride/vinyl acetate copolymers, vinyl fluoride/vinyl chloride copolymers, vinylidene fluoride/vinylidene chloride copolymers, vinyl chloride/vinylidene chloride copolymers, vinyl chloride/vinyl trimethylacetate copolymers, ethylene/vinyl chloride copolymers, after-chlorinated olefin polymers, i. e., addition polymers, such as chlorinated ethylene polymer, after-chlorinated chlorine-containing vinyl and vinylidene polymers such as chlorinated polyvinyl chloride, chlorinated polyvinylidene chloride, chlorinated vinyl chloride/vinylidene chloride copolymers, chlorinated ethylene/vinyl chloride copolymers.

Polymers of the type illustrated by the examples just mentioned, namely, chlorine-containing polymers of polymerizable compounds containing a terminal carbon to carbon double bond are most advantageously used from the standpoint of obtaining plasticized compositions possessing all the desired properties to the highest degree. Other chlorine-containing polymers useful in the practice of this invention are chlorine-containing diene polymers such as polychloroprene, after-chlorinated diene polymers such as chlorinated natural rubber, chlorinated butadiene/styrene polymers, after-chlorinated chlorine-containing diene polymers, for example, chlorinated polychloroprene, chlorosulfonated polymers such as chlorosulfonated ethylene polymer. Although the chlorine-containing polymers can contain other halogens as exemplified by a 90/10 vinyl chloride/vinyl fluoride copolymer, it is preferred to use polymers in which chlorine is the only halogen present.

The grease-like liquid to semi-solid monoolefin/carbon monoxide polymers used in the practice of this invention have a molecular weight of from 200–2000. Of these, those possessing an average molecular weight of 300 to 1500 are of outstanding value for the present purpose because of freedom from volatility and because of greater plasticizing action coupled with ease of incorporation with the polymers to be plasticized.

These monoolefin/carbon monoxide polymers contain at least 10% and up to 50% combined carbon monoxide by weight. Because of the increased compatibility obtained, it is desirable that the polymer contain at least 20% by weight of combined carbon monoxide. Compositions in which the plasticizing monoolefin/carbon monoxide polymer contains from 20% to 40% combined carbon monoxide by weight represents a particularly valuable embodiment of this invention by reason of the still greater compatibility, together with ease of incorporation and high plasticizing action, that is obtained.

The monoolefin/carbon monoxide polymer is blended with the chlorine-containing polymer in amounts of from 1% to 65% by weight of the composition depending upon the particular polymers constituting the composition and upon the properties desired in the composition. For most purposes, however, the optimum balance of plasticizing action with other properties is obtained in the case of compositions in which the monoolefin/carbon monoxide polymer is present in amount of from 10% to 40% by weight. Compositions containing 15% to 35% of this polymer are particularly valuable because of improved compatibility combined with high plasticing action.

The monoolefin/carbon monoxide polymers mentioned in the examples can be replaced with any of the polymers obtained by reacting carbon monoxide with an olefin of 2 to 4 carbon atoms, e. g., ethylene, propylene, butene-1, butene-2, or with a mixture of these olefins.

It is to be noted that while highly compatible plasticized compositions, in which the plasticizer is effective at a wide temperature range, are readily obtained in the case of the chlorine-containing polymers, it is not possible to plasticize similarly other polymers which might ordinarily be used to replace chlorine-containing polymers since the monoolefin/carbon monoxide polymer described herein is incompatible with such other polymers as cellulose acetate, cellulose propionate, cellulose acetate-butyrate, ethyl cellulose, polyvinyl alcohol, polyvinyl acetate and polyacrylonitrile.

The compositions of this invention, depending upon the particular use to which the composition is to be put, can contain in addition to the chlorine-containing polymers and monoolefin/carbon monoxide polymers other materials conventionally incorporated into resinous compositions such as waxes, oils, resins, dyes, plasticizers, tackifiers, stabilizers, curing agents, pigments, fillers, and other modifiers, in amounts up to 80% based on the end composition.

By means of the improved plasticized compositions described herein it is now possible to make supported and unsupported sheeting, and the various products obtained therefrom such as hand bags, seat coverings, etc., which is markedly superior to that previously obtainable for purposes requiring high wear resistance and good flex properties throughout a wide range of temperature with no exudation of plasticizer.

As many apparently widely different embodiments of this invention may be made without departing from the spirit and scope thereof, it is to be understood that this invention is not limited to the specific embodiments thereof except as defined in the appended claims.

I claim:

1. A plasticized resinous composition comprising a polymer containing from 20% to 85.5% chlorine by weight blended with a plasticizing amount of a grease-like 2 to 4 carbon monoolefin/carbon monoxide polymer having a molecular weight of from 200 to 2000, said monoolefin/carbon monoxide polymer containing from 10% to 50% combined carbon monoxide by weight and ranging in properties from a liquid to a semi-solid, said monoolefin/carbon monoxide polymer being obtained from polymerization mixtures containing as the sole polymerizable monomers 2 to 4 carbon monoolefins and carbon monoxide.

2. The plasticized composition defined in claim 1 in which said monoolefin/carbon monoxide polymer contains from 20% to 40% combined carbon monoxide.

3. The plasticized composition defined in claim 1 in which said chlorine-containing polymer is a polymer of a polymerizable aliphatic compound.

4. The plasticized composition defined in claim 1 in which said chlorine-containing polymer is a polymer of a vinylidene compound.

5. The plasticized composition defined in claim 1 in which said chlorine-containing compound is a polymer of a compound having a terminal carbon to carbon double bond.

6. The plasticized composition defined in claim 1 in which said monoolefin is ethylene.

7. A plasticized resinous composition comprising a polymer containing from 20% to 85.5% chlorine by weight blended in plasticizing amount with a grease-like monoolefin/carbon monoxide polymer having a molecular weight of from 300 to 1500 which contains by weight from 20% to 40% combined carbon monoxide and which ranges in properties from a liquid to a semi-solid, said first mentioned polymer being a polymer of a compound having a terminal carbon to carbon double bond, said monoolefin/carbon monoxide polymer being obtained from polymerization mixtures containing as the sole polymerizable monomers 2 to 4 carbon monoolefins and carbon monoxide.

RICHARD D. CRAMER.

REFERENCES CITED

The following references are of record in the file of this patent:

UNITED STATES PATENTS

| Number | Name | Date |
|---|---|---|
| 2,396,963 | Mortenson | Mar. 19, 1946 |
| 2,405,950 | Hanford | Aug. 20, 1946 |